3,219,707
PRODUCTION OF DIAMINES
John T. Patton, Jr., and William W. Levis, Jr., Wyandotte, and William K. Langdon, Grosse Ile, Mich., assignors to Wyandotte Chemicals Corporation, Wyandotte, Mich., a corporation of Michigan
No Drawing. Original application Nov. 27, 1957, Ser. No. 699,155, now Patent No. 3,067,202, dated Dec. 4, 1962. Divided and this application Apr. 19, 1962, Ser. No. 188,880
7 Claims. (Cl. 260—585)

This invention relates to the production of new diamines, that is, diamines which have been known in the laboratory, but which have not been commercially available. In a more specific aspect, this invention relates to a new and improved process for the production of new diamines, e.g., 2,3-butylenediamine, with sufficiently high conversions and yields so that commercial production of these compounds is practical.

This application is a division of our copending application Serial No. 699,155, filed November 27, 1957, now U.S. Patent No. 3,067,202.

2,3-butylenediamine is a known chemical compound which heretofore has been little more than a laboratory curiosity because there is no method known for preparing it with high conversions and yields on an industrial scale. As far as we are aware, the only reported work which is at all related to our process is disclosed in a note by Rene Guillaumin in Compt. rend., 234, pages 2076–2077 (1952) and a subsequent note by the same author in Compt. rend., 236, pages 1270–1271 (1953) disclosing the preparation of tetramethylpyrazine. Guillaumin discloses that tetramethylpyrazine was obtained by condensing 2,3-butanediol and ammonia over a dehydration catalyst, i.e., silica gel or alumina, in vapor phase at about 400° C. It is noted that a maximum yield of 9.5% of tetramethylpyrazine was obtained. No mention is made of the formation of any other diamine and, obviously, a process which provides a yield of only 9.5% is not likely to be adequate as the basis for a commercial process.

An object of this invention is, therefore, to provide a new and improved process for the production of alkylenediamines.

A further object is to provide a method for the production of alkylenediamines with sufficiently high conversions and yields as to make commercial operations based on the process practical.

In contrast to the teachings of Guillaumin referred to above, we have found that, with the proper choice of reaction conditions and catalyst, a vicinal glycol, such as 2,3-butanediol (2,3-butylene glycol) can be reacted with ammonia to produce alkylenediamines with high conversions.

Our new process, in contrast to the disclosure of Guillaumin referred to above, is a liquid phase process employing either a nickel or a cobalt hydrogenation/dehydrogenation catalyst. In further contrast to the teachings of Guillaumin, we employ much lower temperatures, our temperatures falling in the range of 150–200° C. Our process has been employed to produce a 62% conversion to 2,3-butylenediamine. This commercially practical, high conversion is believed to be quite unexpected in view of the relatively low conversions to tetramethylpyrazine obtained by Guillaumin when these same reactants were heated under his reaction conditions in the presence of a dehydration catalyst.

The glycol reactant employed in our process is a vicinal glycol having a pair of secondary hydroxyl radicals. Thus, the glycol reactant can be represented by the formula

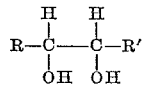

wherein R and R' are alkyl radicals. R and R' can also collectively constitute a polyalkylene radical having 3 to 6, inclusive, carbon atoms. Where both R and R' are methyl radicals, the glycol reactant is 2,3-butylene glycol which, because of its present availability, is preferred for use in the process of our invention. Usually, R and R' are lower alkyl radicals but, since our process is a liquid phase process and thus does not require the vaporization of reactants, any vicinal glycol corresponding to the above formula wherein R and R' are alkyl groups having up to as many as about 18 carbon atoms each can be used. Where R and R' collectively constitute a polyalkylene radical, such as trimethylene, tetramethylene or hexamethylene radicals, the vicinal glycol reactants are 1,2-cyclopentanediol, 1,2-cyclohexanediol and 1,2-cyclooctanediol. Vicinal glycols to be used in the process of the invention can be prepared by hydroxylation of corresponding mono-unsaturated aliphatic or cycloaliphatic hydrocarbons. Examples of other vicinal glycols which can be used include 2,3-butanediol (2,3-butylene glycol), 2,3-pentanediol, 2,3-hexanediol, 3,4-hexanediol, 3,4-heptanediol, 2,3-octanediol, 4,5-octanediol, 2,3-nonanediol, 3,4-nonanediol,, 2,3-dodecanediol, 2,3-hexadecanediol, 2,3-octadecanediol, 2,3-eicosanediol, 9,10-eicosanediol, 9,10-tetracosanediol, 2,3-triacontanediol, 2,3 - hexatriacontanediol, and the like.

Examples of alkylenediamine products which can be obtained by our process thus include 2,3-butylenediamine, 2,3-diaminononane, 7,8-diaminoeicosane, 4,5-diaminohexacosane, 9,10-diaminohexatriacontane, 1,2-diaminocyclohexane, decahydroquinoxaline, tetradecahydrophenazine, and the like.

Our process is a liquid phase process and it is usually carried out under superatmospheric pressure. The pressure can be the autogeneous pressure of the reactants in a closed vessel and can range up to about 3,000 p.s.i.g. or higher. Generally, the pressure is a function of the amount of unreacted ammonia in the system. The pressure can be established by adding hydrogen gas to the reactants and we generally prefer that the pressure fall in the range of 500 to 3000 p.s.i.g. Our highest conversions have been obtained when the pressure was about 1200 p.s.i.g.

As noted above, hydrogen can be employed by adding it to the reactants at the start of the reaction in order that a desired pressure is obtained during the reaction. Hydrogen is not required, however, in order to obtain high conversions of the new diamine products. Hydrogen does have an effect in suppressing the formation of by-products, such as pyrazines, and is believed to aid in the maintenance of the catalyst activity.

The reactants are normally employed in anhydrous condition but aqueous dispersions of the reactants can be employed. Water is a product of the process and additional water can be added to the reactants in order to reduce the vapor pressure of the reactants where this is desirable.

The liquid phase process of this invention can be carried out continuously, wherein the reactants are passed in liquid phase over a nickel or cobalt hydrogenation/dehydrogenation catalyst, or can be carried out as a batch process. Our work has been done in batch processes wherein the reactants were heated and stirred in an autoclave. When the process is carried out as a batch process, the reaction time generally falls in the range of from 2 to about 15 hours. We find that the highest conversions are obtained when the reactants are heated and stirred for about 6 to 12 hours and our best results were obtained when the reactants were heated and stirred about 10 hours.

The critical condition leading to the product which is desired is the combination of (1) the mol ratio of ammonia to vicinal glycol, and (2) the temperature.

These critical conditions are a temperature in the range of about 150–200° C. and a molar proportion of ammonia to vicinal glycol of at least about 3–5 to 1. The optimum conditions for the production of alkylenediamines are a temeprature of about 190° C. and a molar ratio of about 4 mols ammonia per mol of vicinal glycol.

The high conversions and yields of alkylenediamines which are obtained in the process of this invention are obtained by using a nickel or cobalt hydrogenation/dehydrogenation catalyst. Alloy skeletal nickel and alloy skeletal cobalt catalysts have been found to be particularly effective when the method of the invention is carried out as a batch process. Supported nickel or cobalt hydrogenation/dehydrogenation catalysts can also be used when the process of the invention is carried out continuously. Such supported catalysts as the commercially available nickel supported on kieselguhr hydrogenation/dehydrogenation catalysts can be used. Other support materials such as silica gel, pumice, and the like can also be used in the supported nickel or cobalt catalysts.

Alloy skeletal nickel or cobalt catalysts can be prepared by dissolved aluminum from finely divided nickel-aluminum or cobalt-aluminum alloys, respectively. Supported nickel and cobalt catalysts are commonly prepared by suspending a finely divided inert catalyst support in an aqueous solution of a salt of the nickel or cobalt. Sodium carbonate is then added to provide an insoluble nickel or cobalt carbonate. The resulting slurry is then filtered and thoroughly washed with water to remove all sulfate or chloride ions and dried. The powdered mixture of carbonate and catalyst support is then mixed with a lubricant and a binder, pressed into pellets or other desired physical form. For an excellent review of the preparation of nickel and cobalt catalysts of the type that can be employed in our process, see "Catalysis" by Berkman et al., Reinhold Publishing Company, 330 West 42nd Street, New York City, pages 253–265, 1940 Edition.

It is believed that the reaction of a vicinal glycol with ammonia in the process of this invention takes place on the surface of the nickel or cobalt hydrogenation/dehydrogenation catalyst and therefore the catalyst concentration or the contact time between the reactants and the catalyst bed have little or no effect on the over-all yield, but only on the reaction rate. The catalyst concentration, or contact time where the process is carried out continuously, can be varied over wide ranges with proper adjustment of temperature and pressure as disclosed herein and high conversions and yields of the desired alkyl-substituted piperazines are obtained.

When the method of the nivention is carried out as a batch process, a catalyst concentration of about 1 to 5 grams of alloy skeletal nickel or cobalt catalyst per mol of vicinal glycol starting material is effective in the process. The amount of catalyst indicated is stated on a "dry basis," taking into account the amount of water present in an alloy skeletal nickel or cobalt catalyst which is about 50% water. Generally, our highest conversions were obtained in a batch process employing alloy skeletal nickel catalyst with about 2 to 4 grams of the catalyst per mol of the vicinal glycol starting material. The weight of catalyst set forth in the examples reported hereinafter is the actual weight of catalyst as used (drained of excess water), and is on a "wet basis."

The products of the process of the invention include the alkylenediamine main products, depending on reaction conditions employed, and also include alkyl-substituted pyrazines and unreacted vicinal glycol starting material.

The terms "yield" and "conversion" are employed in this specification. The conversion is a measure of the percent of the vicinal glycol starting material that is converted to the alkylenediamine product. Conversion is calculated in accordance with the equation:

Percent conversion to a product =
$$\frac{(\text{Mols product obtained}) \times (100)}{(\text{Theoretical mols of product from vicinal glycol charged})}$$

Yield is calculated on the basis of the vicinal glycol starting material which is actually consumed in the reaction of the invention in accordance with the equation:

Percent yield of a product =
$$\frac{(\text{Mols product obtained}) \times (100)}{(\text{Theoretical mols of product from vicinal glycol consumed})}$$

The following example is set forth to illustrate the method of the invention and should not be used to unduly restrict the scope of the invention as it has been described and claimed herein.

The manipulative steps employed in the following example were these. A weighed amount of the vicinal glycol, 2,3-butylene glycol, and catalyst, Raney nickel drained of excess water, was charged into a one-gallon, electrically heated, stirred autoclave. The autoclave was then purged of air by pressuring twice with nitrogen. Ammonia was weighed into the autoclave. The reaction was carried out under hydrogen pressure. The reactants were then heated with stirring to the desired temperature and this temperature was maintained throughout the reaction time. The reaction products were then cooled to room temperature, the autoclave was vented slowly and a known amount of water was added to the reaction products. The crude reaction product containing the added water was then heated with agitation to 80° C. for one-half hour and the crude reaction mass then discharged from the autoclave. The catalyst was filtered from the reaction product and the reaction product was then fractionally distilled.

The crude reaction product was distilled in a 120 x 2.8 centimeter glass helix-packed column using a partial take-off head and water condenser except where otherwise stated. Unreacted ammonia was first removed using a Dry Ice condenser and then the distillation was continued until the overhead product began to separate into two phases. Substituted pyrazine by-products, if any, were then removed as an oil using a top-decanter head, following which water was removed by further distillation. Unreacted glycol was removed as an azeotrope with cumene using a water-cooled bottom-decanter head. Cumene was then removed as an azeotrope with water using a top-decanter head. The remaining water was then removed by further distillation from the crude reaction product. The butylenediamine product was then obtained upon further distillation of the product.

EXAMPLE

A run was carried out at 190° C. and employing a 4:1 mol ratio of ammonia to 2,3-butylene glycol. 900 grams of 2,3-butylene glycol, 680 grams of anhydrous ammonia and 100 grams of wet Raney nickel catalyst were charged to the autoclave. The reactants were heated to 190° C. for ten hours with agitation and at 1300 p.s.i.g. pressure maintained by hydrogen gas.

There was a conversion of 62% to 2,3-butylenediamine and this product based on the amount of 2,3-butylene glycol consumed in the reaction represented a 68% yield. There was no tetramethylpiperazine or tetramethylpyrazine isolated in the reaction product.

The remarkable facility and ease by which alkylenediamines are produced by the reaction of this invention should be amply demonstrated by the foregoing example. The production of an alkylenediamine, such as butylenediamine, by the process of the invention is surprising when one considers that the product is produced directly from a glycol and ammonia. Propylenediamine has been produced by reacting isopropanolamine with ammonia but here the initial reactant, isopropanolamine, must be prepared prior to the production of propylenediamine. Our process permits the direct production of alkylenediamines from vicinal glycols by reaction with ammonia. Finally, the most significant feature of our process is that the desired products, alkylenediamines, are obtained with such high conversions and yields that commercial operations are quite feasible based on this process. Although the alkylenediamines produced by our process have been known, they have not been available from any supplier, to our knowledge, and the contribution of our invention in providing a basis for the production of these compounds on a commercial scale is believed to be a significant contribution to the art.

We claim:

1. A process for the production of alkylenediamines which comprises, heating to a temperature of 150–200° C. a subsequently defined vicinal glycol and at least about 3–5 mols per mol of said glycol of ammonia, said heating being carried out under at least sufficient pressure so as to maintain the vicinal glycol reactant in liquid phase and in the presence of a catalyst selected from the group consisting of nickel and cobalt hydrogenation/dehydrogenation catalysts, said vicinal glycol corresponding to the formula

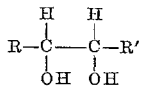

wherein R and R' are members selected from the group consisting of alkyl radicals having up to about 18 carbon atoms and R and R' collectively constituting a polyalkylene radical having 3–6, inclusive, carbon atoms.

2. A process for the production of 2,3-butylenediamine which comprises, heating to a temperature of 150–200° C. 2,3-butylene glycol and at least about 3–5 mols of ammonia per mol of said glycol, said heating being carried out at a pressure in the range of about 500–3000 p.s.i.g. and in the presence of a catalyst selected from the group consisting of nickel and cobalt hydrogenation/dehydrogenation catalysts.

3. The process of claim 1 wherein said catalyst is nickel.

4. The process of claim 1 wherein ammonia is present in an amount of from 3 to 5 mols per mol of vicinal glycol.

5. The process of claim 1 wherein the pressure is from about 500 to 3000 p.s.i.g.

6. The process of claim 2 wherein said catalyst is nickel.

7. The process of claim 2 wherein ammonia is present in an amount of from 3 to 5 mols per mol of vicinal glycol.

References Cited by the Examiner
UNITED STATES PATENTS

| 2,754,330 | 7/1956 | Schreger | 260—585 |
| 2,782,237 | 2/1957 | Hindley et al. | 260—585 |

OTHER REFERENCES

Zelinskii et al.: Chem. Abstracts, vol. 19 (1925), pages 3053–4.

CHARLES B. PARKER, *Primary Examiner.*